April 30, 1946.   L. C. HOLMAN   2,399,350
AUTOMATIC GRAVITY SAFETY SWITCH
Filed July 3, 1944
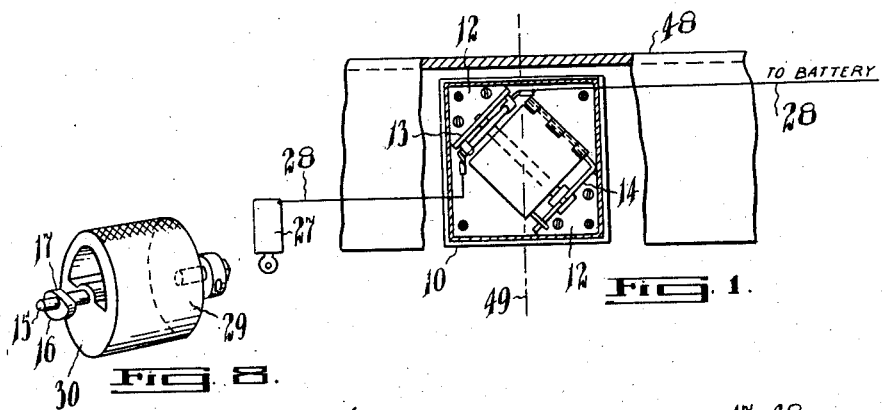
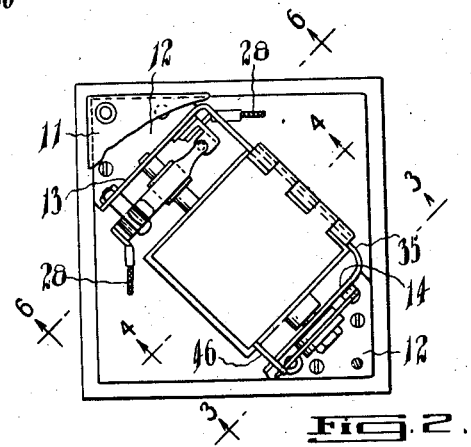
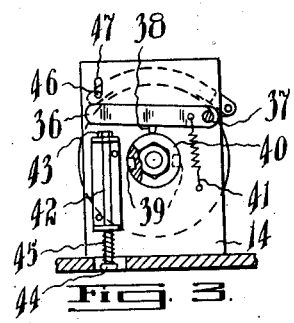
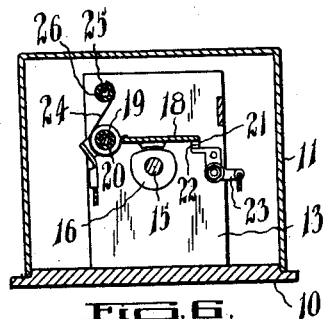
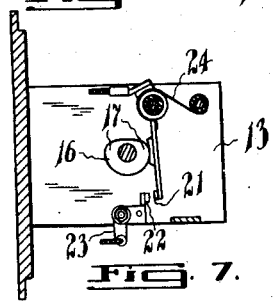
Inventor
L. C. Holman
by Frederick C. Bromley
ATTY.

Patented Apr. 30, 1946

2,399,350

UNITED STATES PATENT OFFICE 2,399,350

AUTOMATIC GRAVITY SAFETY SWITCH

Lloyd C. Holman, Burnaby, British Columbia, Canada

Application July 3, 1944, Serial No. 543,270

1 Claim. (Cl. 200—52)

My invention relates to improvements in protective devices for automobiles and tractors et cetera, and comprehends a contrivance operated by gravity for automatically cutting off the ignition circuit in case of an accident in which the vehicle is caused to topple or is tipped either sidewise or endwise to an inordinate angle. The primary object of the invention is to provide a safety device of this character adapted for interposition in the ignition circuit between the regular key-operated switch and the storage battery, and devised to shut off the engine automatically so as to prevent the vehicle catching fire due to the spilling or escape of fuel.

A still further object is to furnish a simple and efficient safety device which is highly dependable, and one which does not require adjustment at any time. A still further object is to produce a safety device operable in any one of four ways, i. e., by the vehicle turning over toward one side or the other, or tilting or turning over endwise. Accordingly the arrangement of the device is such that it is operably influenced by gravity in any direction in which the vehicle may topple.

The invention is highly useful for motor vehicles and particularly for the protection of tank trucks in the transportation of inflammable fluids such as gasoline and petroleum products. It can be quickly and easily installed at a convenient location such as on or in the vicinity of the instrument panel of the vehicle. The mechanism may be sealed in a case to render it foolproof.

A distinctive feature of the invention is that it comprises an electric switch actuated by a cam which is controlled by a weight piece in the nature of a biased rotor. A further feature is that the device is provided with a brake or like device normally applied to prevent undesirable oscillation of the rotor arising through the sudden starting and stopping of the vehicle, and its travelling over rough roads. The brake is desirably a gravity member which preferably has a positive engagement with the rotor and is arranged so that it is automatically disengaged should the vehicle upset. A still further feature is that the device includes means for locking the switch in its open position. The means comprise a resetting mechanism associated with the brake to permit the rotor to return to its normal position.

Having generally outlined the nature and objects of the invention, reference is now made to the accompanying drawing in which a practical embodiment is illustrated.

In the drawing,

Fig. 1 is a plan view of the device showing the position of the rotor-axis relative to the longitudinal axis of the vehicle.

Fig. 2 is a plan view of the device on an enlarged scale depicting the case broken away.

Fig. 3 is a sectional elevation on line 3—3 of Fig. 2 showing the locking and resetting mechanism.

Fig. 4 is a sectional elevation on line 4—4 of Fig. 2 showing the rotor engaged by a brake.

Fig. 5 is a similar view to Fig. 4 but showing the device turned to a position in which the rotor is released by the brake.

Fig. 6 is a sectional elevation taken on line 6—6 of Fig. 2 depicting the cam and switch.

Fig. 7 is a similar view to Fig. 6 but illustrating the device turned to a position in which the switch is opened.

Fig. 8 is a perspective view of the rotor.

Like numerals of reference indicate corresponding parts in each of the figures throughout the drawing of the invention.

The selected embodiment of the invention comprises a base 10 for supporting the various components of the mechanism which are housed by a cover 11 suitably secured to the base in approved manner and sealed at its juncture as by a gasket. The base is desirably of a rectangular shape, as shown, and has mounted rigidly thereupon, as by the feet 12, a pair of spaced brackets 13 and 14 disposed parallel with each other and at an angle of 45° to the base-sides.

Said brackets jointly carry a horizontal shaft 15 which is journalled therein as by anti-friction bearings. A cam 16 is secured on the shaft in approved manner at the inner side of the bracket 13 and provided with a lift face 17 transversely of the shaft-axis for opening an electric switch upon a predetermined angular movement of the shaft in either direction of turn.

The switch comprises a metal arm 18 extending over the cam and pivoted at an end to the bracket 13 as by a stud 19 having an insulating bushing 20. The other end of the arm has a contact element 21 normally engaged with a contact element 22 integral with a binding post 23 mounted on the bracket 13 and suitably insulated. The engagement of said contact elements is effected by a flat spring 24 extending from the arm 18 and tensioned against a pin 25 provided with an insulating bushing 26. The switch is interposed in the ignition circuit of the vehicle engine intermediate of the battery and the regular key-operated switch, indicated at 27, by which the circuit is controlled, as will be well understood. Lead wires 28 extend from the arm 18 and the binding post 23 for making the necessary electric connection with the battery (not shown) and the key switch 27.

The cam is actuated by a rotor 29 fixed on the shaft 15 and consisting of a cylindrical member having a weight mass 30 at one side of its axis and a peripheral brake surface 31 at the opposite side thereof. The biased rotor functions to retain the cam free engagement with the switch arm so that the side of the circuit between the battery and the key switch is completed for normal operation of the engine.

In the stable position of the rotor, as best shown in Fig. 4, the brake surface 31 is at the top thereof and is engaged by a brake shoe 32 having an inner surface 33 curved in conformity with the rotundity of the rotor. The brake surface 31 and the mating surface 33 of the shoe are preferably knurled as shown or otherwise serrated in order to interfit and thus form a positive lock for the rotor. The shoe rests upon the rotor and its own weight supplies the force with which engagement is effected.

The shoe is hinged at 34 to one side of shaft 15 by means of a member 35 integral with or secured to the brackets aforesaid. The brake functions to prevent undesirable oscillation of the rotor in the ordinary operation of the vehicle, and assures that the cam will not operate to open the switch except upon an accident occurring resulting in the vehicle being tipped or toppled to a right angle or thereabouts. In the event of the vehicle tipping or toppling the brake shoe swings outwardly on its hinged connection, as indicated in Fig. 5, and automatically releases the rotor so that it can instantly throw the switch to an open position, as shown in Fig. 7. The lift face 17 of the cam operates in either direction of movement of the rotor for the purpose of raising the switch arm 18.

When the switch is opened it must be retained in this position otherwise the rotor might inadvertently close it again, as for instance in the event of an accident in which the vehicle is caused to run down an embankment. The means for retaining the switch in an open position comprises a detent in the form of a lever 36 pivoted at 37 and provided with a dog 38 for engaging notches 39 provided in a collar 40 rigid with the shaft 15. Two notches are employed, one at a suitable angle at each side of the centre of gravity of the rotor. The lever is pressed by a spring 41 and the dog rests on the periphery of the collar in normal position as shown in Fig. 3.

To release the rotor from the position in which it is locked by the locking device there is provided a resetting device for manual operation. This comprises a plunger 42 guidably supported on the bracket 14 for endwise movement and provided with a head 43 at its upper end for urging the lever 36 away from the collar. The lower end of the plunger is supplied with a button 44 and is spring retained as at 45. It will be evident that on pressing the button the plunger will lift the lever and disengage the dog from the notch in which it is seated according to the direction in which the rotor has been caused to turn to a locking position.

In order to assure that the brake will not hinder the return of the rotor in the resetting operation, means are supplied for raising the brake shoe concurrently with the disengagement of the locking device. The means preferably consists of a pin 46 laterally extending from the brake shoe at a point remote of its pivotal axis and projecting over the distal end of the lever 36. The pin is positioned in close proximity to the lever so as to be engaged and lifted by it when the button 44 is depressed. Consequently the brake shoe is elevated clear of the rotor. The pin operates in a slot 47 in the bracket 14 and the ends of the slot limit the movement of the brake shoe.

An important feature of the invention is that the rotor-axis is disposed diagonally of the base 10 so that the protective device shall be installed in a vehicle with said rotor-axis arranged at an oblique angle to the longitudinal axis thereof. This disposition of the rotor axis provides for the four-way action of the device, i. e., it enables the device to operate when the vehicle is tipped to one side or the other, or forwardly or backwardly. Consequently the device will function irrespective of the direction in which the vehicle may be upset, and the locking mechanism will act to retain the switch open so that should the vehicle roll there will be no possibility of the switch closing and re-energizing the ignition circuit. As shown in Fig. 1 the protective device may be installed in the instrument panel 48 of an automobile with the rotor-axis at an angle of 45° to the longitudinal axis 49 of the vehicle. It will be obvious, however, that it may be otherwise located on a vehicle.

It will be manifest that the invention provides a highly reliable and serviceable protective device in which the ignition circuit cannot be inadvertently interrupted by incidental oscillation of the rotor arising from sudden starting and stopping of the vehicle, or its passage over rough roads, et cetera.

While the invention has been disclosed in its contemplated form it will be understood that such changes and modifications may be resorted to as come within the spirit and scope of the appended claim.

What I claim is:

A protective device of the class described comprising a supporting unit, an electric switch mounted thereon having a self-closing contact arm, a shaft horizontally journalled in the supporting unit transversely of said contact arm, a cam fixed on the shaft having a lift face for imparting an opening movement to said contact arm in either direction of turn of the shaft, a biased rotor fixed on the shaft having an upper circular brake surface, a brake shoe pivoted on said supporting unit at one side of the rotor axis and disposed over the rotor for engagement with the brake surface thereof, a collar rigid with said shaft and having an aperture at each side of the centre of gravity of the rotor, a lever pivoted on said supporting unit and extending over said collar, a dog carried by the lever for engaging the apertures in the collar, a spring urging the lever toward the collar, a spring-restrained plunger mounted on said supporting unit for urging the lever away from the collar to disengage the dog upon manual depression, and a pin extending from the distal part of said brake shoe and disposed over said lever for engagement therewith when the plunger is depressed so that the brake shoe will be raised to free the rotor.

LLOYD C. HOLMAN.